(12) United States Patent
Choueifati et al.

(10) Patent No.: US 10,393,420 B2
(45) Date of Patent: *Aug. 27, 2019

(54) REFRIGERATION SYSTEM WITH BRUSHLESS DC MOTOR COMPRESSOR DRIVE

(71) Applicant: Hill Phoenix, Inc., Conyers, GA (US)

(72) Inventors: Jules G. Choueifati, Richmond, VA (US); Timothy D. Swofford, Midlothian, VA (US); Neil J. Rathje, South Chesterfield, VA (US)

(73) Assignee: Hill Phoenix, Inc., Conyers, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,883

(22) Filed: Nov. 2, 2018

(65) Prior Publication Data

US 2019/0072308 A1 Mar. 7, 2019

Related U.S. Application Data

(63) Continuation of application No. 14/996,062, filed on Jan. 14, 2016, now Pat. No. 10,151,518.
(Continued)

(51) Int. Cl.
*F25B 49/02* (2006.01)

(52) U.S. Cl.
CPC .......... *F25B 49/025* (2013.01); *F25B 49/027* (2013.01); *F25B 2339/047* (2013.01); *F25B 2400/22* (2013.01); *F25B 2600/0253* (2013.01); *F25B 2600/111* (2013.01); *F25B 2600/112* (2013.01); *F25B 2600/13* (2013.01); *F25B 2600/2513* (2013.01); *F25B 2700/195* (2013.01); *Y02B 30/741* (2013.01); *Y02B 30/743* (2013.01); *Y02B 30/745* (2013.01)

(58) Field of Classification Search
CPC .............. F25B 25/005; F25B 2313/004; F25B 2339/047; F25B 2400/22; F25B 2600/111; F25B 2700/195
See application file for complete search history.

(56) References Cited

U.S. PATENT DOCUMENTS 2,952,991 A 9/1960 St. Pierre
5,436,547 A 7/1995 Nagai et al.
(Continued)

*Primary Examiner* — Jonathan Bradford
(74) *Attorney, Agent, or Firm* — Foley & Lardner LLP

(57) ABSTRACT

A refrigeration system for a temperature-controlled storage device includes a refrigeration circuit, a cooling circuit, and a controller. The refrigeration circuit includes a compressor driven by a brushless DC motor operable at multiple different speeds, a first heat exchanger, an expansion device, and a cooling unit in fluid communication via a first working fluid. The cooling circuit includes a pump and a second heat exchanger in fluid communication with the first heat exchanger via a second working fluid such that the first heat exchanger is liquid-cooled by the second working fluid. The controller operates the brushless DC motor at multiple different speeds to accommodate multiple different thermal loads experienced by the refrigeration system. Each of the speeds corresponds to a different thermal load. The controller modulates the speed of the brushless DC motor to maintain a desired temperature of a temperature-controlled space within the temperature-controlled device.

16 Claims, 5 Drawing Sheets

Related U.S. Application Data

(60) Provisional application No. 62/104,512, filed on Jan. 16, 2015.

(56) References Cited

U.S. PATENT DOCUMENTS

| | | | |
|---|---|---|---|
| 7,540,164 B2 | 6/2009 | Roche et al. | |
| 2007/0199337 A1* | 8/2007 | Otake | F24D 17/02 |
| | | | 62/183 |
| 2008/0006044 A1 | 1/2008 | Tan | |
| 2009/0064710 A1 | 3/2009 | Kaga | |
| 2014/0318170 A1* | 10/2014 | Katoh | F28F 9/26 |
| | | | 62/324.5 |

* cited by examiner

REFRIGERATION SYSTEM WITH BRUSHLESS DC MOTOR COMPRESSOR DRIVE

CROSS-REFERENCE TO RELATED PATENT APPLICATION

This application claims the benefit of and priority as a continuation of U.S. patent application Ser. No. 14/996,062, filed Jan. 14, 2016, which claims priority to U.S. Provisional Patent Application No. 62/104,512, filed Jan. 16, 2015, which are hereby incorporated by reference herein in their entireties.

BACKGROUND

The present invention relates generally to the field of temperature-controlled display devices (e.g., refrigerated display devices or cases, etc.) having a temperature-controlled space for storing and displaying products such as refrigerated foods or other perishable objects. More specifically, the present invention relates to refrigeration system for a temperature-controlled display device. More specifically still, the present invention relates to a refrigeration system for a temperature-controlled display device that uses a brushless DC motor to circulate a refrigerant within a refrigeration circuit.

Temperature-controlled display devices (e.g., refrigerators, freezers, refrigerated merchandisers, refrigerated display cases, etc.) may be used in commercial, institutional, and residential applications for storing or displaying refrigerated or frozen objects. Refrigerated display cases are a type of temperature-controlled storage device that are often used to display fresh food products (e.g., beef, pork, poultry, fish, etc.) in a supermarket or other commercial setting. Refrigerated display cases typically include cooling elements (e.g., cooling coils, heat exchangers, evaporators, etc.) that receive a coolant (e.g., a liquid such as a glycol-water mixture, a refrigerant, etc.) from a refrigeration system to provide cooling to the temperature-controlled space. Fans are typically used to move air over the cooling elements to facilitate heat transfer thereto. Some refrigerated display cases have doors that can be opened (e.g., by a customer) to access products within the temperature-controlled space. Other refrigerated display cases have an open front and use fans to create an air barrier (e.g., an air curtain) to prevent outside air from entering the temperature-controlled space.

Some commercial refrigeration systems (e.g., in a supermarket) use centralized parallel compressor systems with long liquid and suction branches piped to and from the evaporators in the refrigerated display cases. However, remotely locating elements of the refrigeration system (e.g., compressors, condensers) can result in expensive field piping, large refrigerant charge and leakage, and parasitic heating of the liquid and suction piping. Other commercial refrigeration systems use self-contained refrigerated display cases that include all of the components of the refrigeration system (e.g., contained within a housing of the display case, positioned on top of the display case, etc.).

The compressors used in conventional refrigeration systems often suffer from a variety of disadvantages such as a lack of variable capacity, energy inefficiency, excess noise, etc. It would be desirable to provide a refrigerated display case with an improved compressor that overcomes these and other disadvantages.

SUMMARY

One exemplary embodiment relates to a refrigeration system for a temperature-controlled storage device. The refrigeration system includes a refrigeration circuit, a cooling circuit, and a controller. The refrigeration circuit includes a compressor driven by a brushless DC motor operable at multiple different speeds, a first heat exchanger, an expansion device, and a cooling unit in fluid communication via a first working fluid. The cooling circuit includes a pump and a second heat exchanger in fluid communication with the first heat exchanger via a second working fluid such that the first heat exchanger is liquid-cooled by the second working fluid. The controller operates the brushless DC motor at multiple different speeds to accommodate multiple different thermal loads experienced by the refrigeration system. Each of the speeds corresponds to a different thermal load. The controller modulates the speed of the brushless DC motor to maintain a desired temperature of a temperature-controlled space within the temperature-controlled device.

In some embodiments, the refrigeration circuit further includes a first fan that provides an airflow across the cooling unit to cool the airflow. The cooled airflow may be provided to the temperature-controlled space within the temperature-controlled device. In some embodiments, the controller modulates a speed of the first fan to modulate a rate of heat transfer experienced by the temperature-controlled space to maintain the desired temperature of the temperature-controlled space.

In some embodiments, the controller operates the expansion device to control a flow rate of the first working fluid passing therethrough and entering the cooling unit to modulate a rate of heat transfer experienced by the airflow flowing across the cooling unit to maintain the desired temperature of the temperature-controlled space.

In some embodiments, the controller modulates the speed of the brushless DC motor to control a flow rate of the first working circulating through the refrigeration circuit to modulate a rate of heat transfer experienced by the airflow flowing across the cooling unit to maintain the desired temperature of the temperature-controlled space.

In some embodiments, the cooling circuit further includes a second fan that provides an airflow across the second heat exchanger to cool the second working fluid. In some embodiments, the controller modulates a speed of the second fan to modulate a rate of heat transfer experienced by the second working fluid flowing through the second heat exchanger. The second working fluid may absorb heat from the first working fluid in the first heat exchanger to maintain the desired temperature of the temperature-controlled space.

In some embodiments, the controller modulates a speed of the pump to control a flow rate of the second working fluid circulating through the cooling circuit to modulate a rate of heat transfer from the first working fluid to the second working fluid in the first heat exchanger to maintain the desired temperature of the temperature-controlled space.

In some embodiments, the expansion device is an expansion valve configured to adjust expansion of the first working fluid passing therethrough. In some embodiments, the brushless DC motor is liquid-cooled.

Another exemplary embodiment relates to a refrigeration circuit for a temperature-controlled storage device. The refrigeration circuit includes a compressor, a variable-speed brushless DC motor, a heat exchanger, an expansion device, a cooling unit, and a controller. The compressor circulates a working fluid through the refrigeration circuit and is driven by the variable-speed brushless DC motor. The heat exchanger receives the working fluid from the compressor and provides cooling for the working fluid. The expansion device receives the cooled working fluid from the heat exchanger and expands the working fluid to a lower-temperature state. The cooling element receives the expanded working fluid from the expansion device and provides the working fluid to the compressor. The controller operates the variable-speed brushless DC motor at multiple different speeds to accommodate multiple different thermal loads. Each of the speeds corresponds to a different thermal load. The controller modulates the speed of the brushless DC motor to maintain a desired temperature of a temperature-controlled space within the temperature-controlled device. The compressor, the heat exchanger, the expansion device, and the cooling element are in fluid communication via the working fluid.

In some embodiments, the refrigeration circuit includes a fan that provides an airflow across the cooling element to cool the airflow. The cooled airflow may be provided to the temperature-controlled space within the temperature-controlled device.

In some embodiments, the controller modulates a speed of the fan to modulate a rate of heat transfer experienced by the temperature-controlled space to maintain the desired temperature of the temperature-controlled space.

In some embodiments, the controller operates the expansion device to control a flow rate of the working fluid passing therethrough and entering the cooling element to modulate a rate of heat transfer experienced by the airflow flowing across the cooling element to maintain the desired temperature of the temperature-controlled space.

In some embodiments, the controller modulates the speed of the variable speed brushless DC motor to control a flow rate of the working fluid circulating through the refrigeration circuit to modulate a rate of heat transfer experienced by the airflow flowing across the cooling element to maintain the desired temperature of the temperature-controlled space.

In some embodiments, the refrigeration circuit includes a fan that provides an airflow across the heat exchanger to cool the working fluid flowing therethrough such that the heat exchanger is air-cooled. The controller may modulate a speed of the fan to modulate a rate of heat transfer experienced by the working fluid flowing through the heat exchanger to maintain the desired temperature of the temperature-controlled space.

In some embodiments, the refrigeration circuit includes a pressure sensor configured to measure a pressure of the working fluid at an inlet of the heat exchanger. The controller may modulate a speed of the fan to control the pressure of the working fluid at the inlet of the heat exchanger.

In some embodiments, the heat exchanger is liquid-cooled with a second working fluid. The controller may modulate a flow rate of the second working fluid with a valve to modulate a rate of heat transfer between the first working fluid and the second working fluid flowing through the heat exchanger to maintain a desired pressure of the first working fluid at an inlet of the heat exchanger.

In some embodiments, the expansion device is an expansion valve configured to adjust expansion of the first working fluid passing therethrough. In some embodiments, the variable-speed brushless DC motor is liquid-cooled.

Still another exemplary embodiment relates to a refrigeration circuit for a temperature-controlled storage device. The refrigeration circuit includes a brushless DC motor operable at multiple different speeds and a controller. The brushless DC motor drives a compressor that circulates a working fluid through the refrigeration circuit. The controller operates the brushless DC motor at multiple different speeds to accommodate multiple different thermal loads. Each of the speeds corresponds to a different thermal load. The controller modulates the speed of the brushless DC motor to maintain a desired temperature of a temperature-controlled space within the temperature-controlled device.

In some embodiments, the refrigeration circuit includes a cooling unit and a fan. The cooling unit may be configured to provide cooling for the temperature-controlled space by transferring heat from the temperature-controlled space to the working fluid. The fan may provide an airflow across the cooling unit to cool the airflow. The cooled airflow may be provided to the temperature-controlled space within the temperature-controlled storage device.

In some embodiments, the controller modulates a speed of the fan to modulate a rate of heat transfer experienced by the temperature-controlled space to maintain the desired temperature of the temperature-controlled space. In some embodiments, the controller modulates the speed of the brushless DC motor to control a flow rate of the working fluid circulating through the refrigeration circuit.

In some embodiments, the refrigeration circuit includes a heat exchanger and a pressure sensor. The heat exchanger may be configured to provide cooling for the working fluid. The pressure sensor may be configured to measure a pressure of the working fluid at an inlet of the heat exchanger. The controller may modulate a speed of the fan to control the pressure of the working fluid at the inlet of the heat exchanger.

In some embodiments, the heat exchanger is liquid-cooled with a second working fluid. The controller may modulate a flow rate of the second working fluid with a valve to modulate a rate of heat transfer between the working fluid and the second working fluid flowing through the heat exchanger to maintain a desired pressure of the working fluid at an inlet of the heat exchanger.

The invention is capable of other embodiments and of being carried out in various ways. Alternative exemplary embodiments relate to other features and combinations of features as may be recited herein.

DETAILED DESCRIPTION

Referring generally to the FIGURES, a refrigeration system with a brushless DC motor compressor drive and components thereof are shown, according to various exemplary embodiments. The refrigeration system may be used in conjunction with a temperature-controlled display device (e.g., a refrigerated merchandiser) or other refrigeration device used to store and/or display refrigerated or frozen objects in a commercial, institutional, or residential setting. The refrigeration system includes a heat exchanger (e.g., a gas cooler, a condenser), an expansion valve, a cooling unit (e.g., an evaporator), and a compressor. The compressor is driven by a brushless DC motor which may be controlled by an electronic controller. In some embodiments, brushless DC motors are also used to drive other components of the refrigeration system (e.g., pumps, fans, etc.).

Advantageously, using a brushless DC motor to drive the compressor provides a number of advantages over conventional refrigeration systems. For example, using a brushless DC motor to drive a refrigeration compressor may significantly reduce the power consumption of the refrigeration system relative to compressors that use traditional brushed and/or AC motors. The decreased power consumption results in an increased compressor efficiency and decreases the total cost of operating the refrigeration system. The brushless DC motor also has a decreased susceptibility to wear and an increased reliability relative to traditional compressor motors. Additionally, the brushless DC motor can be operated (e.g., by the controller) at various speeds to allow the same compressor to accommodate varying refrigeration loads in an energy efficient manner. These and other advantages of a refrigeration system with a brushless DC motor compressor drive are described in greater detail below.

Figure 1:
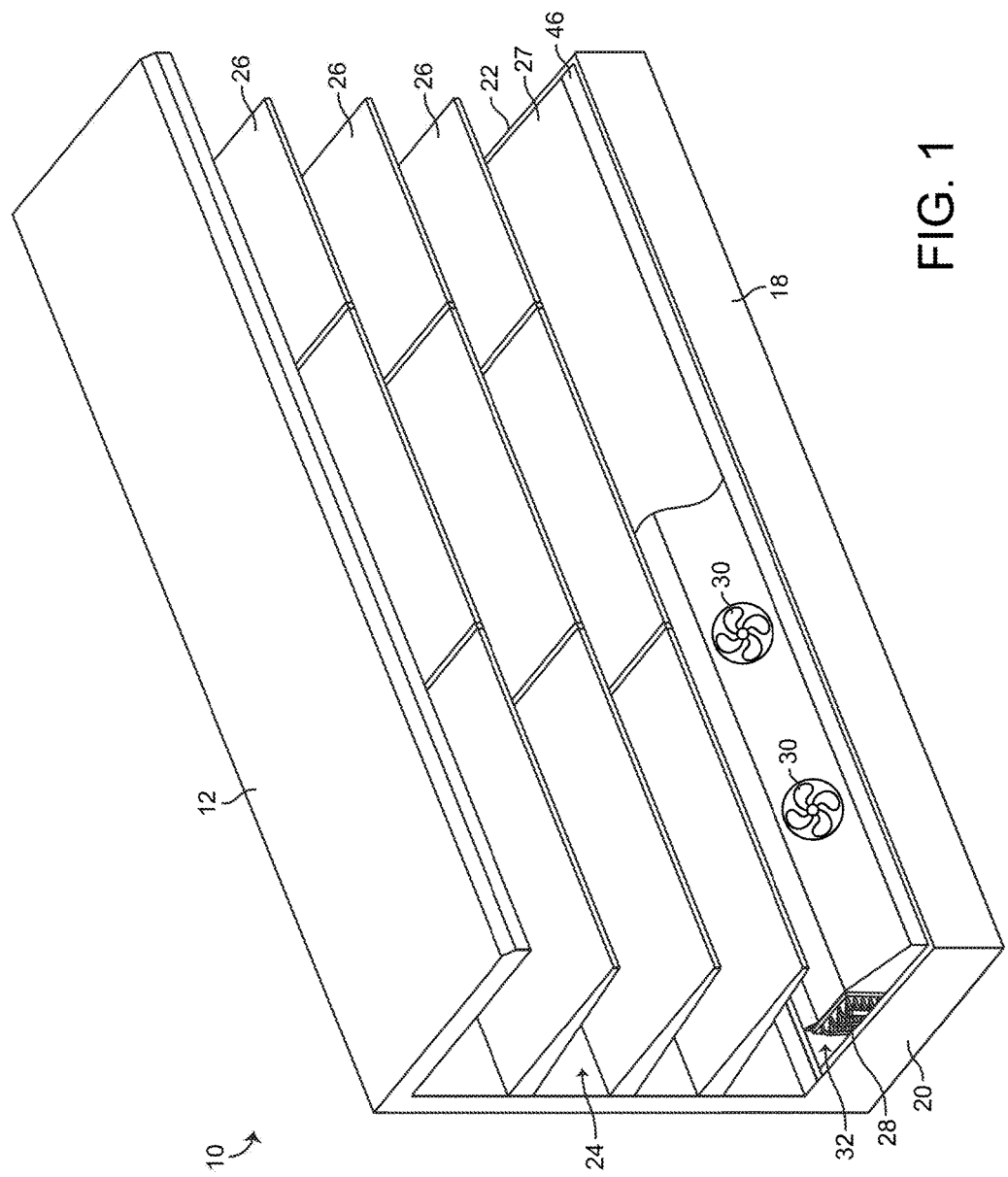
FIG. 1 is a perspective view of a temperature-controlled display device, according to an exemplary embodiment.
Figure 2:
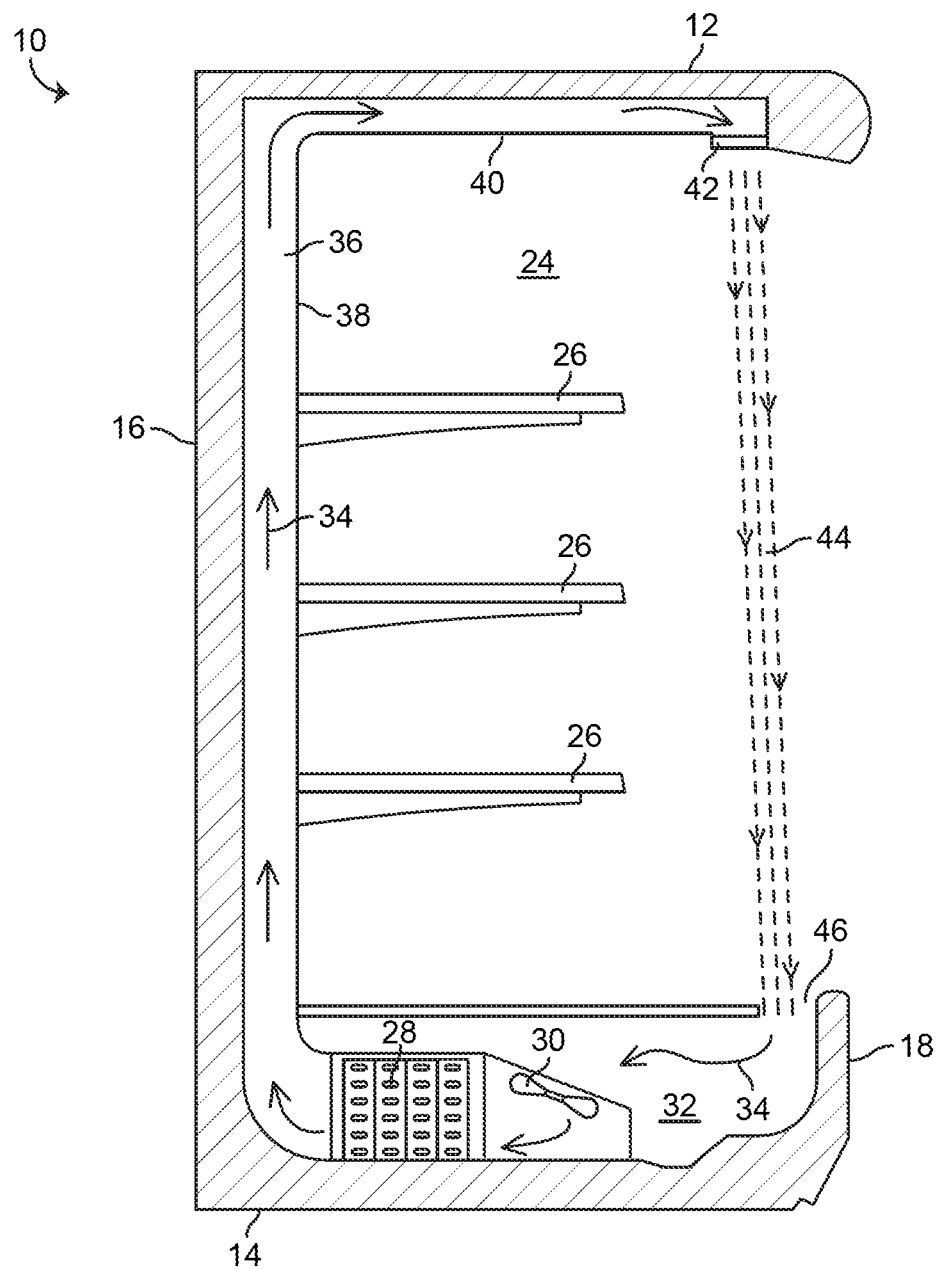
FIG. 2 is a cross-sectional elevation view of the temperature-controlled display device of FIG. 1, according to an exemplary embodiment.

Referring now to FIGS. 1-2, a temperature-controlled display device 10 is shown, according to an exemplary embodiment. Temperature controlled-display device 10 may be a refrigerator, a freezer, a refrigerated merchandiser, a refrigerated display case, or other device capable of use in a commercial, institutional, or residential setting for storing and/or displaying refrigerated or frozen objects. For example, temperature-controlled display device 10 may be a service type refrigerated display case for displaying fresh food products (e.g., beef, pork, poultry, fish, etc.) in a supermarket or other commercial setting.

Temperature-controlled display device 10 is shown as a refrigerated display case having a top 12, bottom 14, back 16, front 18, and sides 20-22 that at least partially define a temperature-controlled space 24 within which refrigerated or frozen objects can be stored. In some embodiments, front 18 is at least partially open (as shown in FIGS. 1-2) to facilitate access to the refrigerated or frozen objects stored within temperature-controlled space 24. In other embodiments, front 18 may include one or more doors (e.g., hinged doors, sliding doors, etc.) that move between an open position and a closed position. The doors may be insulated glass doors including one or more transparent panels such that the objects within temperature-controlled space 24 can be viewed through the doors (i.e., from the exterior of display device 10) when the doors are closed. Similarly, sides 20-22 may be at least partially open (as shown in FIGS. 1-2) or closed to define side walls of temperature-controlled space 24.

Temperature-controlled display device 10 is shown to include a plurality of shelves 26-27 upon which refrigerated or frozen objects can be placed for storage and/or display. Shelves 26 may be located at various heights within temperature-controlled space 24. Shelf 27 defines a lower boundary of temperature-controlled space 24 and separates temperature-controlled space 24 from a lower space 32 within which various components of a refrigeration circuit for temperature-controlled display device 10 may be contained.

Space 32 is shown to include a cooling element 28 and a fan 30. Cooling element 28 may include a cooling coil, a heat exchanger, an evaporator, or other component configured to provide cooling for temperature-controlled space 24. Cooling element 28 may be part of a refrigeration circuit (e.g., refrigeration circuit 50, 80, and/or 100, shown in FIGS. 3-5) and may be configured to absorb heat from an airflow 34 passing over or through cooling element 28. Fan 30 may include one or more fans configured to cause airflow 34 through cooling element 28. In some embodiments, fan 30 causes airflow 34 from cooling element 28 to pass through a channel 36 along a rear surface 38 and/or upper surface 40 of temperature-controlled space 24. Rear surface 38 and/or upper surface 40 may include a plurality of outlets distributed along channel 36 (e.g., holes in rear surface 38 and/or upper surface 40 into channel 30) through which airflow 34 can pass from channel 30 into temperature-controlled space 24.

Referring particularly to FIG. 2, channel 36 is shown to include an outlet 42 configured to direct airflow 34 downward from a front end of channel 36. The downward airflow from outlet 42 may form an air curtain 44 between outlet 42 and inlet 46. Air curtain 44 may help retain chilled air within temperature-controlled space 24 and may prevent the ingression of ambient air (e.g., warmer air from outside temperature-controlled display device 10) into temperature-controlled space 24. Air curtain 44 and airflow 34 may be created by operating fan 30. Fan 30 may be configured to draw airflow 34 through inlet 46 and may cause airflow 34 to pass through cooling element 28. Airflow 34 is chilled by cooling element 28 and is forced into temperature-controlled space 24 by operation of fan 30.

Figure 3:
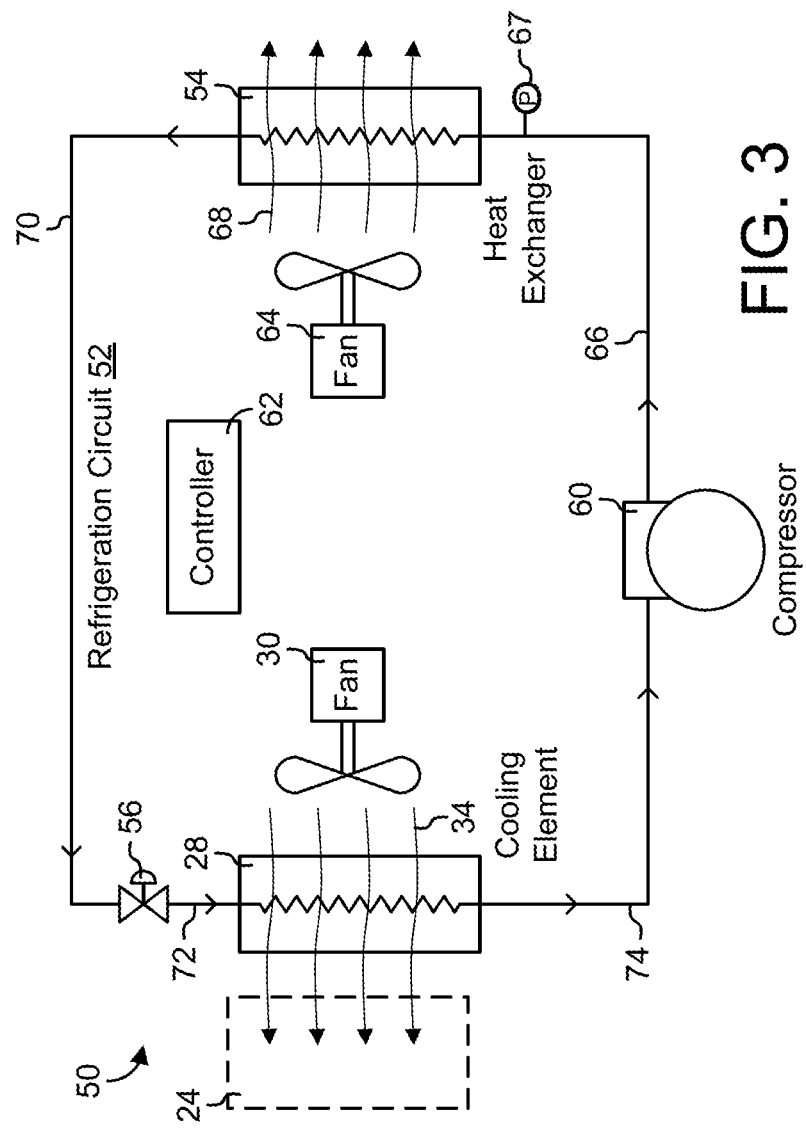
FIG. 3 is a block diagram of an air-cooled refrigeration system which may be used in conjunction with the temperature-controlled display device of FIG. 1, according to an exemplary embodiment.
Figure 4:
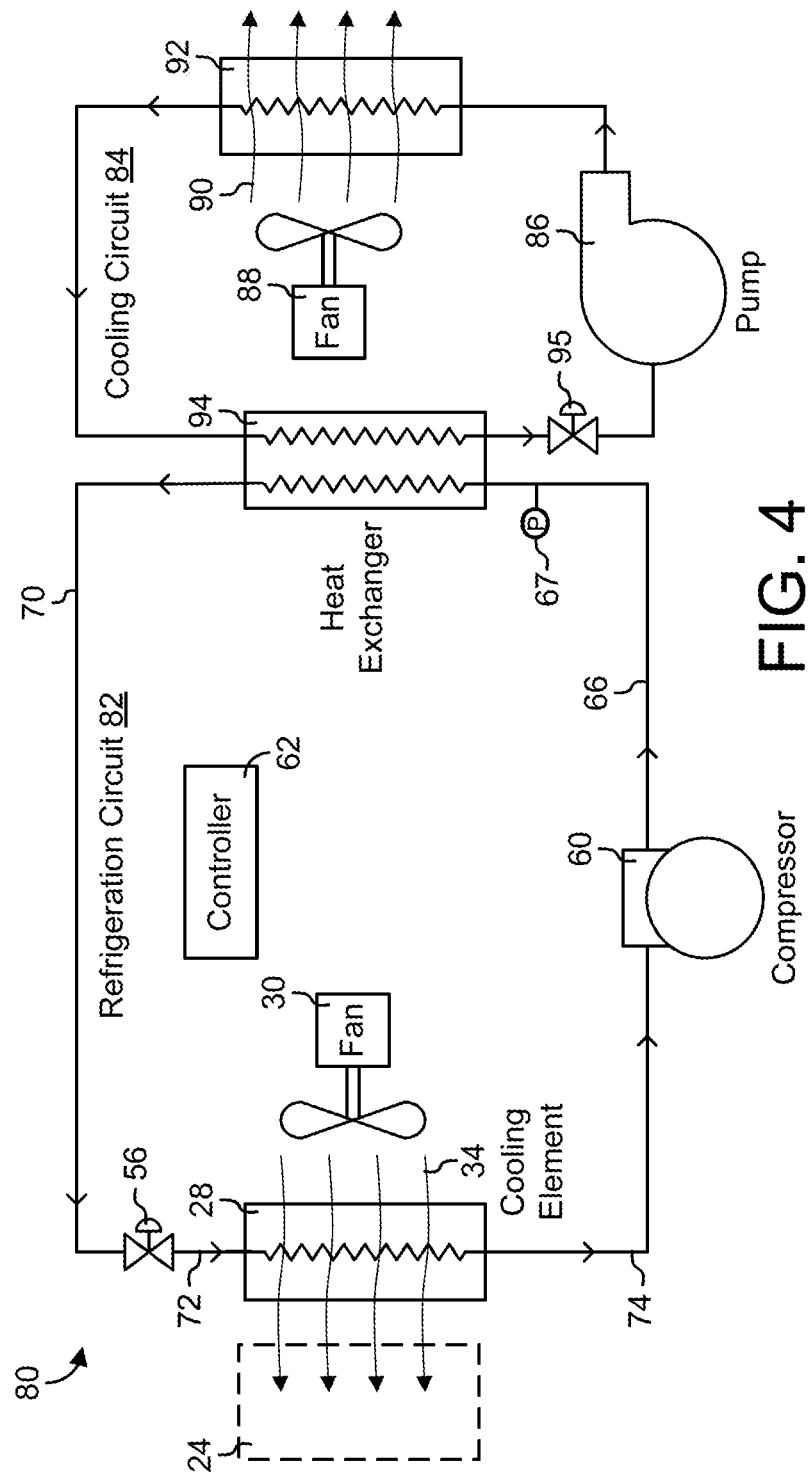
FIG. 4 is a block diagram of a liquid-cooled refrigeration system which may be used in conjunction with the temperature-controlled display device of FIG. 1, according to an exemplary embodiment.
Figure 5:
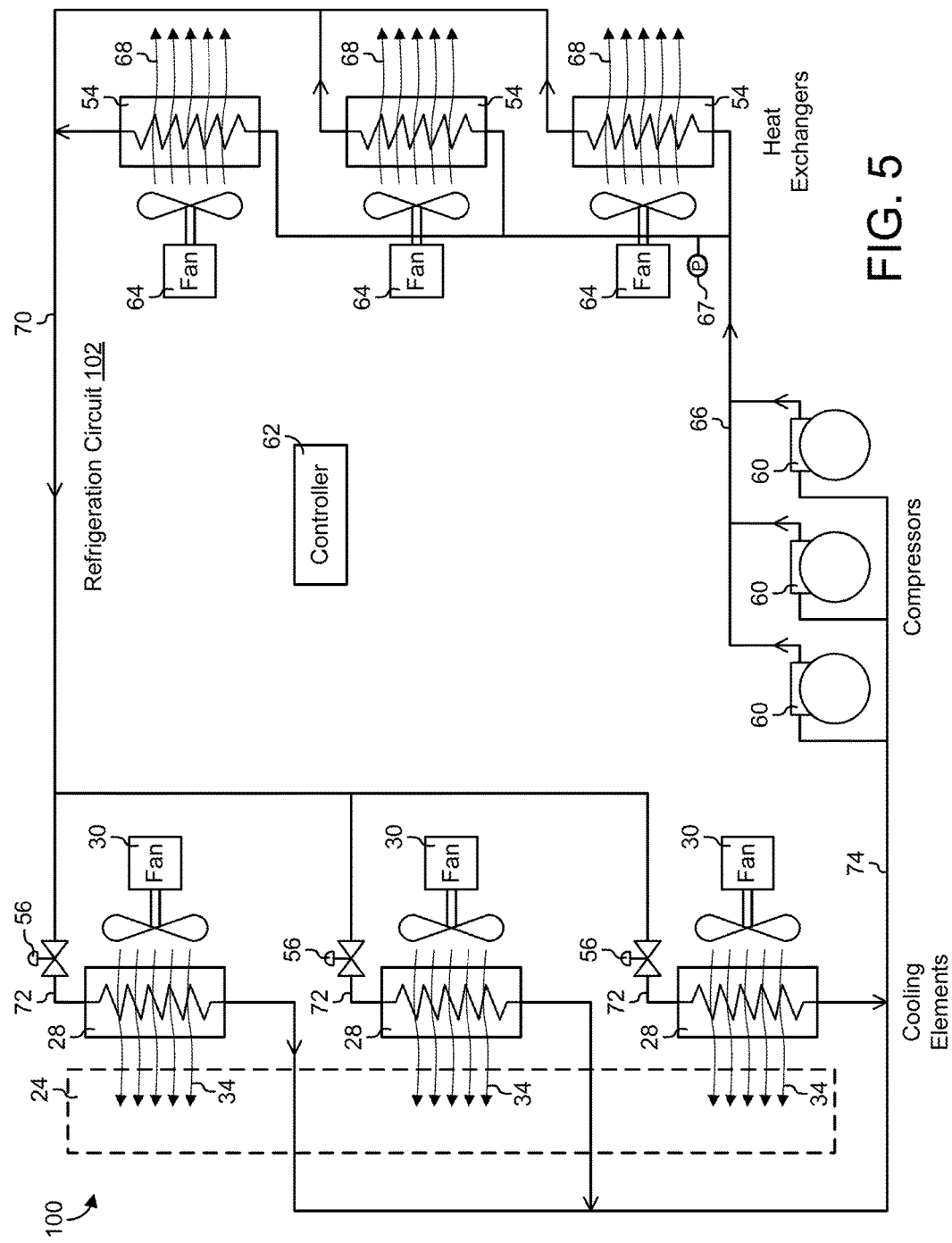
FIG. 5 is a block diagram of a refrigeration system with multiple parallel compressors, heat exchangers, and cooling elements which may be used in conjunction with the temperature-controlled display device of FIG. 1, according to an exemplary embodiment.

Referring now to FIGS. 3-5, several refrigeration systems 50, 80, and 100 which may be used in conjunction with temperature-controlled display device 10 are shown, according to an exemplary embodiment. Referring particularly to FIG. 3, an air-cooled refrigeration system 50 is shown, according to an exemplary embodiment. Refrigeration system 50 is shown to include a refrigeration circuit 52 including an air cooled condenser or cooler, shown as heat exchanger 54, an expansion device, shown as expansion valve 56, a cooling unit (e.g., evaporator, heat exchanger, etc.), shown as cooling element 28, and a driver, shown as compressor 60.

Compressor 60 may be configured to circulate a refrigerant through refrigeration circuit 52. Compressor 60 may compress the refrigerant to a high pressure, high temperature state and discharge the compressed refrigerant into line 66. Compressor 60 may be a reciprocating compressor, a scroll compressor, a rotary compressor, or any other type of compressor that can be used to compress the refrigerant. In some embodiments, compressor 60 is driven by a brushless DC motor. Advantageously, using a brushless DC motor with compressor 60 enables compressor 60 to operate at variable speeds and/or capacities. In some embodiments, the brushless DC motor and/or compressor 60 are liquid (e.g., water, glycol, etc.) cooled. In other embodiments, the brushless DC motor and/or compressor 60 are air cooled. In still other embodiments, at least one of the brushless DC motor and compressor 60 are liquid and air cooled. In some embodiments, compressor 60 is operated by a controller 62. Controller 62 may adjust the speed of compressor 60 based on the refrigeration load (e.g., to control a flow rate of the working fluid to modulate a rate of heat transfer to airflow 34 to maintain a desired temperature of the temperature-controlled space 24, etc.). Since the speed of compressor 60 is adjustable, a single compressor 60 can be used for a variety of applications and can accommodate multiple different refrigeration loads without sacrificing energy efficiency. Other features and advantages of the brushless DC motor are described in greater detail below.

Heat exchanger 54 may be configured to cool the compressed refrigerant in line 66. In various embodiments, heat exchanger 54 may be a gas cooler (i.e., a heat exchanger configured to remove heat from gaseous refrigerant without causing condensation) or a condenser (i.e., a heat exchanger configured to condense a gaseous refrigerant to a liquid or mixed gas-liquid state). In refrigeration system 50, heat exchanger 54 is an air-cooled heat exchanger which transfers heat from the compressed refrigerant into an airflow 68 caused by a fan 64. Fan 64 may be controlled by controller 62 to modulate the rate of heat transfer in heat exchanger 54 (e.g., between the working fluid and the airflow 68, etc.). In some embodiments, fan 64 is a variable speed fan capable of operating at multiple different speeds. Controller 62 may increase or decrease the speed of fan 64 in response to various inputs from refrigeration circuit 50 (e.g., temperature measurements, pressure measurements, humidity measurements, enthalpy measurements, etc.). For example, a pressure sensor 67 may be located at the inlet of heat exchanger 54. Pressure sensor 67 may be configured to measure the pressure of the working fluid in line 66, at the inlet of heat exchanger 54. Controller 62 may be configured to modulate the speed of fan 64 to control the pressure of the working fluid at the inlet of heat exchanger 54 (i.e., the pressure measured by pressure sensor 67).

Still referring to FIG. 3, line 70 is shown connecting an outlet of heat exchanger 54 to an inlet of expansion valve 56. Expansion valve 56 may be configured to expand the refrigerant in line 70 to a low temperature and low pressure state. Expansion valve 56 may be fixed position valves or variable position valves. Expansion valve 56 may be actuated manually or automatically (e.g., by controller 62 via a valve actuator) to adjust the expansion (or flow rate) of the refrigerant passing therethrough. In some embodiments, expansion valve 56 may be operated as a fluid control valve to direct the refrigerant through cooling element 28. Expansion valve 56 may output the expanded refrigerant into line 72. Line 72 is shown extending from an outlet of expansion valve 56 to an inlet of cooling element 28.

Cooling element 28 may be the same as described with reference to FIGS. 1-2. For example, cooling element 28 may include cooling coils, heat exchangers, evaporators, or other components configured to provide cooling for temperature-controlled space 24. Cooling element 28 may be configured to absorb heat from airflow 34 passing over or through cooling element 28 and transfer the absorbed heat into the refrigerant. Fan 30 may be controlled by controller 62 to modulate the rate of heat transfer from temperature-controlled space 24 into cooling element 28. In some embodiments, fan 30 is a variable speed fan capable of operating at multiple different speeds. Controller 62 may increase or decrease the speed of fan 30 in response to various inputs from refrigeration circuit 52 (e.g., temperature measurements, humidity measurements, enthalpy measurements, etc.). Cooling element 28 may output the refrigerant into line 74, which connects cooling element 28 to the suction side of compressor 60.

Referring now to FIG. 4, a liquid-cooled refrigeration system 80 is shown, according to an exemplary embodiment. In some embodiments, liquid-cooled refrigeration system 80 may be used in conjunction with temperature-controlled display device 10. Liquid-cooled refrigeration system 80 is shown to include refrigeration circuit 82 and a separate cooling circuit 84. Refrigeration circuit 82 may include many of the same components of refrigeration circuit 52, as described with reference to FIG. 3. For example, refrigeration circuit 82 is shown to include expansion valve 56, cooling element 28, and compressor 60, which may operate as described with reference to refrigeration circuit 52. However, refrigeration circuit 82 includes a liquid-cooled cooler or condenser, shown as heat exchanger 94, in place of heat exchanger 54.

Liquid-cooled heat exchanger 94 receives the compressed refrigerant from line 66. Liquid-cooled heat exchanger 94 also receives a separate heat exchange fluid (e.g., water, glycol, etc.) from cooling circuit 84 and transfers heat from the compressed refrigerant into the heat exchange fluid in cooling circuit 84. Cooling circuit 84 is shown to include a pump 86 which operates to circulate the heat exchange fluid between heat exchanger 94 and another heat exchanger 92. Pump 86 may be controlled by controller 62 to modulate a flow rate of the heat exchange fluid throughout cooling circuit 84 to thereby modulate the rate of heat transfer from the heat exchange fluid into airflow 90 (e.g., within heat exchanger 92, etc.). In some embodiments, controller 62 is configured to operate a valve 95 of cooling circuit 84 to modulate the flow rate of the heat exchange fluid through cooling circuit 84. Controller 82 may operate valve 95 to maintain a desired pressure and/or temperature of the working fluid in refrigeration circuit 82 at the inlet of heat exchanger 94 (e.g., the pressure measured by pressure sensor 67).

In heat exchanger 92, the heat exchange fluid rejects the absorbed heat to an airflow 90 passing over or through heat exchanger 92. In some embodiments, airflow 90 is created by operation of a fan 88. Fan 88 may be controlled by controller 62 to modulate the rate of heat transfer from the heat exchange fluid into airflow 90 (e.g., within heat exchanger 92, etc.). In some embodiments, heat exchanger 92 and/or heat exchanger 94 is a heat-reclaim heat exchanger configured to use the heat absorbed from the compressed refrigerant for heating purposes (e.g., heating water, providing heat to a space, melting frost or ice, anti-condensate heating for display device 10, etc.).

In some embodiments, compressor 60 and/or the DC brushless motor of compressor 60 are liquid cooled by the cooling circuit 84 (e.g., via the separate heat exchange fluid, etc.). For example, the heat exchange fluid that circulates within cooling circuit 84 may be used to provide direct liquid cooling for compressor 60 and/or the brushless DC motor that drives compressor 60. In some embodiments, the heat exchange fluid from cooling circuit 84 is routed to compressor 60 before or after passing through heat exchanger 94 such that the heat exchange fluid absorbs heat from both heat exchanger 94 and compressor 60 in series. In other embodiments, the heat exchange fluid from cooling circuit 84 may be routed to compressor 60 in parallel with heat exchanger 94 such that a first portion of the heat exchange fluid absorbs heat from heat exchanger 94 and a second portion of the heat exchange fluid absorbs heat from compressor 60 and/or the brushless DC motor that drives compressor 60.

In some embodiments, compressor 60 and/or the brushless DC motor are liquid cooled by a second cooling circuit separate from cooling circuit 84. The second cooling circuit may be the same or similar to cooling circuit 84, with the exception that the second cooling circuit absorbs heat from compressor 60 and/or the brushless DC motor rather than from heat exchanger 94. In other embodiments, compressor 60 and/or the brushless DC motor are air cooled. For example, a fan (e.g., similar to fans 30 and 88) may be included in refrigeration circuit 80 and used to force an airflow across compressor 60 and/or the brushless DC motor. The airflow may absorb heat from compressor 60 and/or the brushless DC motor to provide cooling for such components.

Referring now to FIG. 5, another refrigeration system 100 which may be used in conjunction with temperature-controlled display device 10 is shown, according to an exemplary embodiment. Refrigeration system 100 is shown to include a refrigeration circuit 102 which includes multiple instances of many of the same components of refrigeration circuit 52, as described with reference to FIG. 3. For example, refrigeration system 100 is shown to include multiple heat exchangers 54, multiple expansion valves 56, multiple cooling elements 28, multiple compressors 60, and multiple fans 30 and 64.

Compressors 60 may be arranged in parallel and may be configured to circulate a refrigerant through refrigeration circuit 102. In some embodiments, compressors 60 are operated by controller 62. Compressors 60 may compress the refrigerant to a high pressure, high temperature state and discharge the compressed refrigerant into line 66. In some embodiments, each of compressors 60 is driven by a brushless DC motor, as described with reference to FIG. 3. Advantageously, using a brushless DC motor to drive compressors 60 allows compressors 60 to operate at various speeds to accommodate different refrigeration loads.

Heat exchangers 54 may be arranged in parallel and may be configured to cool the compressed refrigerant in line 66. In various embodiments, heat exchangers 54 may be gas coolers (i.e., heat exchangers configured to remove heat from gaseous refrigerant without causing condensation) or condensers (i.e., heat exchangers configured to condense a gaseous refrigerant to a liquid or mixed gas-liquid state). In some embodiments, heat exchangers 54 are air-cooled heat exchangers (as shown in FIG. 5) which transfer heat from the compressed refrigerant to an airflow 68 caused by fans 64. In other embodiments, heat exchangers 54 are liquid-cooled heat exchangers (as shown in FIG. 4) and/or heat-reclaim heat exchangers configured to use the heat absorbed from the compressed refrigerant for heating purposes (e.g., heating water, providing heat to a space, melting frost or ice, anti-condensate heating for display device 10, etc.). Heat exchangers 54 may be configured to transfer heat from the compressed refrigerant into another fluid circulating through heat exchangers 54 (e.g., another refrigerant, a separate refrigeration circuit, etc.) or into the ambient environment. In some embodiments, refrigeration circuit 102 includes fluid control valves immediately upstream or downstream of heat exchangers 54 to direct the refrigerant through a subset of heat exchangers 54.

Expansion valves 56 may be arranged in parallel and may be configured to expand the refrigerant in line 70 to a low temperature and low pressure state. Expansion valves 56 may be fixed position valves or variable position valves. Expansion valves 56 may be actuated manually or automatically (e.g., by controller 62 via a valve actuator) to adjust the expansion of the refrigerant passing therethrough. In some embodiments, expansion valves 56 may be operated as fluid control valves to direct the refrigerant through a subset of cooling elements 28. Each of expansion valves 56 may be positioned upstream of a corresponding cooling element 28. Cooling elements 28 function to absorb heat from airflow 34 passing over or through cooling elements 28 and into temperature-controlled space 24. Cooling elements 28 output the refrigerant into line 74, which connects to the suction side of compressors 60.

Referring again to FIGS. 3-5, each of refrigeration systems 50, 80, and 100 is shown to include a controller 62. Controller 62 may be configured to operate various components of refrigeration systems 50, 80, and 100 to provide refrigeration for temperature-controlled space 24. For example, controller 62 may operate compressors 60, fans 30, 64, and 88, expansion valves 56, pump 86, and/or other operable components of refrigeration circuits 50, 80 and 100 (e.g., flow control valves, pressure regulation valves, etc.). Controller 62 may also control other components of temperature-controlled display device 10 such as an anti-condensate heaters, a lighting element, a condensate dissipation system, and/or other auxiliary components of temperature-controlled display device 10.

Controller 62 may receive input from various sensory devices of refrigeration systems 50, 80, and 100 (e.g., temperature sensors, humidity sensors, pressure sensors, enthalpy sensors, voltage sensors, proximity sensors, etc.) Sensors may be disposed at any location relative to temperature-controlled display device 10. For example, sensors may be positioned along any of lines 66-74, within temperature-controlled space 24, within cooling circuit 84, or otherwise positioned to measure any variable state or condition of temperature-controlled display device 10. Controller 62 may use the sensory inputs to determine appropriate control outputs for the operable components of refrigeration systems 50, 80, and 100.

In some embodiments, controller 62 receives input from the sensory devices via a communications interface. The communications interface may include wired or wireless interfaces (e.g., jacks, antennas, transmitters, receivers, transceivers, wire terminals, etc.) for conducting data communications with various systems, devices, or networks. For example, the communications interface may include an Ethernet card and port for sending and receiving data via an Ethernet-based communications network. In another example, the communications interface may include a WiFi transceiver for communicating via a wireless communications network. The communications interface may be configured to communicate via local area networks or wide area networks (e.g., the Internet, a building WAN, etc.) and may use a variety of communications protocols (e.g., TCP/IP, point-to-point, etc.).

In some embodiments, controller 62 uses the communications interface to send control signals to various operable components of refrigeration systems 50, 80, and 100. For example, controller 62 may send control signals to compressors 60, fans 30, 64, and 88, valves 56, pump 86, and/or other operable components of refrigeration systems 50, 80, and 100 (e.g., flow control valves, pressure regulation valves, etc.). In some embodiments, controller 62 uses the communications interface to communicate with other components of temperature-controlled display device 10 such as an anti-condensate heaters, a lighting element, a condensate dissipation system, and/or other auxiliary components.

In some embodiments, controller 62 includes a processing circuit having a processor and memory. The processor may be a general purpose or specific purpose processor, an application specific integrated circuit (ASIC), one or more field programmable gate arrays (FPGAs), a group of processing components, or other suitable processing components. The processor may be configured to execute computer code or instructions stored in memory or received from other computer readable media (e.g., CDROM, network storage, a remote server, etc.). Memory may include one or more devices (e.g., memory units, memory devices, storage devices, etc.) for storing data and/or computer code for completing and/or facilitating the various processes described in the present disclosure. Memory may include random access memory (RAM), read-only memory (ROM), hard drive storage, temporary storage, non-volatile memory, flash memory, optical memory, or any other suitable memory for storing software objects and/or computer instructions. Memory may include database components, object code components, script components, or any other type of information structure for supporting the various activities and information structures described in the present disclosure. Memory may be communicably connected to the processor via the processing circuit and may include computer code for executing one or more processes described herein.

In some embodiments, temperature-controlled display device 10 is a self-contained refrigeration unit which includes all of the components of the refrigeration system. Various components of refrigeration systems 50, 80, and 100 may be located within temperature-controlled display device 10 or proximate to temperature-controlled display device 10. For example, cooling elements 28 and expansion valves 56 may be located within space 32 and/or temperature-controlled space 24 as shown in FIGS. 1-2. Compressors 60, heat exchangers 54 and 92-94, fans 30, 64, and 88, pump 86, and/or controller 62 may be located on top of temperature-controlled display device 10 (i.e., above top 12), behind temperature-controlled display device 10 (e.g., behind back 14) or in a separate space within temperature-controlled display device 10 (e.g., below bottom 14, adjacent to temperature-controlled space 24, etc.). Refrigerant lines 66 and 70-74 may extend within temperature-controlled display device 10 or along a surface of temperature-controlled display device to connect various components of refrigeration systems 50, 80, and 100.

In other embodiments, temperature-controlled display device 10 is part of a distributed refrigeration system. In a distributed refrigeration system, cooling elements 28 are located within temperature-controlled space 24, whereas other components of refrigeration systems 50, 80, and 100 may be remotely located. Refrigerant lines 66 and 70-74 may extend between temperature-controlled display device 10 and the remote location to connect various components of refrigeration systems 50, 80, and 100.

In some embodiments, the refrigeration system used by temperature-controlled display device 10 includes a compressor (e.g., compressor 60) that is driven by a brushless DC motor. Brushless DC motors (BLDC motors, BL motors) also known as electronically commutated motors (ECMs, EC motors) are synchronous motors that are powered by a DC electric source via an integrated inverter/switching power supply. The integrated inverted/switching power supply produces an AC electric signal to drive the motor. In this context, AC (alternating current) does not imply a sinusoidal waveform, but rather a bi-directional current with no restriction on waveform. Additional sensors and electronics control the inverter output amplitude and waveform (and therefore percent of DC bus usage/efficiency) and frequency (i.e. rotor speed). The rotor of a brushless motor is often a permanent magnet synchronous motor, but can also be a switched reluctance motor or induction motor. In some embodiments, the coils of the brushless DC motor are stationary.

Brushless DC motors provide a number of advantages over traditional brushed DC motors. For example, brushed DC motors develop a maximum torque when stationary, linearly decreasing as velocity increases. Brushless DC motors are often higher efficiency and have a lower susceptibility to mechanical wear. A brushless motor has permanent magnets which rotate around a fixed armature, eliminating problems associated with connecting current to the moving armature. An electronic controller (e.g., controller 62) replaces the brush/commutator assembly of the brushed DC motor, which continually switches the phase to the windings to keep the motor turning. Controller 62 may perform similar timed power distribution by using a solid-state circuit rather than the brush/commutator system.

Brushless motors can provide more torque per weight, more torque per watt (increased efficiency), increased reliability, reduced noise, longer lifetime (no brush and commutator erosion), elimination of ionizing sparks from the commutator, and overall reduction of electromagnetic interference (EMI) relative to a brushed motor. With no windings on the rotor, brushless motors are not subjected to centrifugal forces. Since the windings are supported by the housing, brushless motors can be cooled by conduction, requiring no airflow inside the motor for cooling. This in turn means that the motor's internals can be entirely enclosed and protected from dirt or other foreign matter.

Brushless motor commutation can be implemented in software using a microcontroller (e.g., controller 62) or microprocessor computer, or may alternatively be implemented in analogue hardware, or in digital firmware using an FPGA. Commutation with electronics instead of brushes allows for greater flexibility and capabilities not available with brushed DC motors, including speed limiting, micro stepped operation for slow and/or fine motion control, and a holding torque when stationary.

When converting electricity into mechanical power, brushless motors are more efficient than brushed motors. This improvement is largely due to the brushless motor's velocity being determined by the frequency at which the electricity is switched, not the voltage. Additional gains are due to the absence of brushes, which reduces mechanical energy loss due to friction. The enhanced efficiency is greatest in the no-load and low-load region of the motor's performance curve. Advantageously, the use of a brushless DC motor in refrigeration systems 50, 80, and/or 100 may facilitate maintenance-free operation, high speeds, and operation where sparking is hazardous (i.e. explosive environments) or could affect electronically sensitive equipment.

Controller 62 may direct the rotor rotation of the brushless DC motor and may be configured to detect the rotor's orientation/position (relative to the stator coils). For example, controller 62 may use Hall effect sensors or a rotary encoder to directly measure the rotor's position. In other embodiments, controller 62 may measure the back EMF in the undriven coils to infer the rotor position, eliminating the need for separate Hall effect sensors. Controller 62 may provide the brushless DC motor with bi-directional outputs (i.e. frequency controlled three phase output), which are determined by controller 62. In various embodiments, controller 62 may use comparators to determine when the output phase should be advanced or use a microcontroller to manage acceleration, control speed, and fine-tune efficiency.

In some embodiments, the brushless DC motor may constructed using an inrunner configuration or an outrunner configuration. In the inrunner configuration, the permanent magnets are part of the rotor and three stator windings surround the rotor. In the outrunner (or external-rotor) configuration, the radial-relationship between the coils and magnets is reversed; the stator coils form the center (core) of the motor, while the permanent magnets spin within an overhanging rotor which surrounds the core. The outrunner configuration may include more poles than the inrunner configuration (e.g., set up in triplets to maintain the three groups of windings) and may have a higher torque at low RPMs. In some embodiments, the brushless DC motor may be constructed using stator and rotor plates mounted face to face (e.g., for embodiments in which the space or shape of the motor is limited).

In some embodiments, the brushless DC motor uses a delta configuration for the electrical windings. The delta configuration connects three windings to each other (series circuits) in a triangle-like circuit, and power is applied at each of the connections. In other embodiments, the brushless DC motor uses a Wye (Y-shaped) configuration or star winding. The Wye configuration connects all of the windings to a central point (parallel circuits) and power is applied to the remaining end of each winding. A motor with windings in the delta configuration gives low torque at low speed, but can give higher top speed. The Wye configuration gives high torque at low speed, but a lower top speed. Controller 62 may treat both styles of windings in the same manner when providing control signals to the brushless DC motor.

It is contemplated that a brushless DC motor may provide advantages to refrigeration systems 50, 80, and 100 over conventional AC motors. For example, the brushless DC motor may significantly reduce the power required to operate compressors 60 relative to a typical AC motor. Fans 30, 64, and 88 can also be operated using a brushless DC motor in order to increase overall system efficiency. In addition to the brushless motor's higher efficiency, refrigeration systems 50, 80, and 100 can take advantage of a brushless DC motor's variable-speed and/or load modulation to adaptively operate compressors 60 to accommodate varying refrigeration loads. The use of controller 62 to control the brushless DC motor allows for programmability, better control over fluid flow (e.g., refrigerant flow, airflow, etc.), and serial communication.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

The background section is intended to provide a background or context to the invention recited in the claims. The description in the background section may include concepts that could be pursued, but are not necessarily ones that have been previously conceived or pursued. Therefore, unless otherwise indicated herein, what is described in the background section is not prior art to the description and claims and is not admitted to be prior art by inclusion in the background section.

What is claimed is:

1. A refrigeration system for a temperature-controlled storage device, comprising:
   a refrigeration circuit including a compressor driven by a brushless DC motor operable at multiple different speeds, a first heat exchanger, an expansion device, and a cooling unit in fluid communication via a first working fluid;
   a cooling circuit including a pump and a second heat exchanger in fluid communication with the first heat exchanger via a second working fluid such that the first heat exchanger is liquid-cooled by the second working fluid, the cooling circuit further including a valve operable to modulate a flow rate of the second working fluid through the first heat exchanger; and
   a controller configured to operate the brushless DC motor at multiple different speeds to accommodate multiple different thermal loads experienced by the refrigeration system, each of the speeds corresponding to a different thermal load, wherein the controller is configured to modulate a speed of the brushless DC motor to maintain a desired temperature of a temperature-controlled space within the temperature-controlled storage device, and the controller is configured to operate the valve to maintain a desired pressure of the first working fluid at the inlet of the first heat exchanger.

2. The refrigeration system of claim 1, wherein the refrigeration circuit further includes a first fan configured to provide an airflow across the cooling unit to cool the airflow; wherein the cooled airflow is provided to the temperature-controlled space within the temperature-controlled device.

3. The refrigeration system of claim 2, wherein the controller is configured to modulate a speed of the first fan to modulate a rate of heat transfer experienced by the temperature-controlled space to maintain the desired temperature of the temperature-controlled space.

4. The refrigeration system of claim 2, wherein the controller is configured to operate the expansion device to control a flow rate of the first working fluid passing therethrough and entering the cooling unit to modulate a rate of heat transfer experienced by the airflow flowing across the cooling unit to maintain the desired temperature of the temperature-controlled space.

5. The refrigeration system of claim 2, wherein the controller is configured to modulate the speed of the brushless DC motor to control a flow rate of the first working fluid circulating through the refrigeration circuit to modulate a rate of heat transfer experienced by the airflow flowing across the cooling unit to maintain the desired temperature of the temperature-controlled space.

6. A refrigeration circuit for a temperature-controlled storage device, comprising:
   a compressor configured to circulate a first working fluid through the refrigeration circuit;
   a variable-speed brushless DC motor operable to drive the compressor;
   a heat exchanger configured to receive the first working fluid from the compressor and provide cooling for the first working fluid;
   a valve operable to modulate a flow rate of a second working fluid through the heat exchanger;
   an expansion device configured to receive the cooled first working fluid from the heat exchanger and expand the first working fluid to a lower-temperature state;
   a cooling element configured to receive the expanded first working fluid from the expansion device and provide the first working fluid to the compressor; and
   a controller configured to operate the variable-speed brushless DC motor at multiple different speeds to accommodate multiple different thermal loads, each of the speeds corresponding to a different thermal load, wherein the controller is configured to modulate a speed of the brushless DC motor to maintain a desired temperature of a temperature-controlled space within the temperature-controlled storage device, and the controller is configured to operate the valve to maintain a desired pressure of the first working fluid at the inlet of the first heat exchanger;
   wherein the compressor, the heat exchanger, the expansion device, and the cooling element are in fluid communication via the first working fluid.

7. The refrigeration circuit of claim 6, further comprising a fan configured to provide an airflow across the cooling element to cool the airflow;
   wherein the cooled airflow is provided to the temperature-controlled space within the temperature-controlled device.

8. The refrigeration circuit of claim 7, wherein the controller is configured to modulate a speed of the fan to modulate a rate of heat transfer experienced by the temperature-controlled space to maintain the desired temperature of the temperature-controlled space.

9. The refrigeration circuit of claim 6, wherein the controller is configured to operate the expansion device to control a flow rate of the first working fluid passing therethrough and entering the cooling element to modulate a rate of heat transfer experienced by an airflow flowing across the cooling element to maintain the desired temperature of the temperature-controlled space.

10. The refrigeration circuit of claim 6, wherein the controller is configured to modulate the speed of the variable speed brushless DC motor to control a flow rate of the first working fluid circulating through the refrigeration circuit to modulate a rate of heat transfer experienced by an airflow flowing across the cooling element to maintain the desired temperature of the temperature-controlled space.

11. The refrigeration circuit of claim 6, further comprising a fan configured to provide an airflow across the heat exchanger to cool the first working fluid flowing therethrough such that the heat exchanger is air-cooled.

12. The refrigeration circuit of claim 6, wherein the heat exchanger is configured to be liquid-cooled with the second working fluid.

13. A refrigeration circuit for a temperature-controlled storage device, comprising:
   a brushless DC motor operable at multiple different speeds, the brushless DC motor driving a compressor that circulates a first working fluid through the refrigeration circuit;
   a heat exchanger configured to provide cooling for the first working fluid;
   a valve operable to modulate a flow rate of a second working fluid through the heat exchanger; and
   a controller configured to operate the brushless DC motor at multiple different speeds to accommodate multiple different thermal loads, each of the speeds corresponding to a different thermal load, wherein the controller is configured to modulate a speed of the brushless DC motor to maintain a desired temperature of a temperature-controlled space within the temperature-controlled storage device, and the controller is configured to operate the valve to maintain a desired pressure of the first working fluid at the inlet of the heat exchanger at a desired pressure.

14. The refrigeration circuit of claim 13, further comprising:
   a cooling unit configured to provide cooling for the temperature-controlled space by transferring heat from the temperature-controlled space to the first working fluid; and
   a fan configured to provide an airflow across the cooling unit to cool the airflow;
   wherein the cooled airflow is provided to the temperature-controlled space within the temperature-controlled storage device.

15. The refrigeration circuit of claim 13, wherein the controller is configured to modulate a speed of the fan to modulate a rate of heat transfer experienced by the temperature-controlled space to maintain the desired temperature of the temperature-controlled space.

16. The refrigeration circuit of claim 13, wherein the controller is configured to modulate the speed of the brushless DC motor to control a flow rate of the first working fluid circulating through the refrigeration circuit.

* * * * *